United States Patent [19]
Lacy et al.

[11] Patent Number: 5,882,515
[45] Date of Patent: Mar. 16, 1999

[54] INLINE FILTER HAVING SWIVEL FITTING

[75] Inventors: Charles R. Lacy, Murrietta; Michael T. Baird, Canyon Lake, both of Calif.

[73] Assignee: Hydro-Flow Filtration Systems, Inc., Temecula, Calif.

[21] Appl. No.: 612,981

[22] Filed: Mar. 1, 1996

[51] Int. Cl.$^6$ .................................................. B01D 27/08
[52] U.S. Cl. ..................... 210/232; 210/241; 210/459; 210/460; 285/272
[58] Field of Search ................. 285/8, 272, 273, 285/275; 210/232, 241, 459, 460

[56] References Cited

U.S. PATENT DOCUMENTS

| | | | |
|---|---|---|---|
| 4,713,175 | 12/1987 | Bray | 210/460 |
| 4,981,586 | 1/1991 | Bartholomew | 210/459 |
| 5,275,444 | 1/1994 | Wythoff | 285/272 |

*Primary Examiner*—W. L. Walker
*Attorney, Agent, or Firm*—Brent F. Logan

[57] ABSTRACT

An inline filter having a swivel right-angle fitting for coupling an inlet or outlet tube. The fitting includes a stem having a pair of O-rings and a distal ridge and notch. The cap of the filter includes a port having a plurality of annular, resilient tabs that engage the notch and ridge to retain the fitting to the cap.

10 Claims, 3 Drawing Sheets

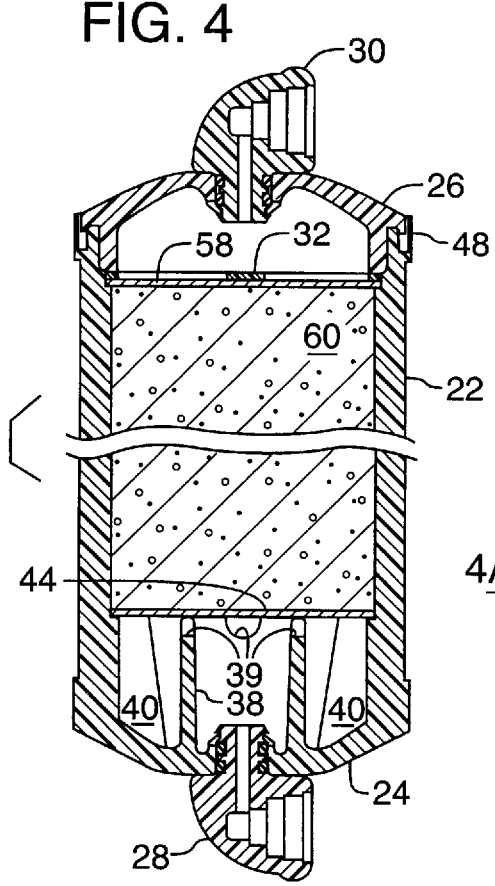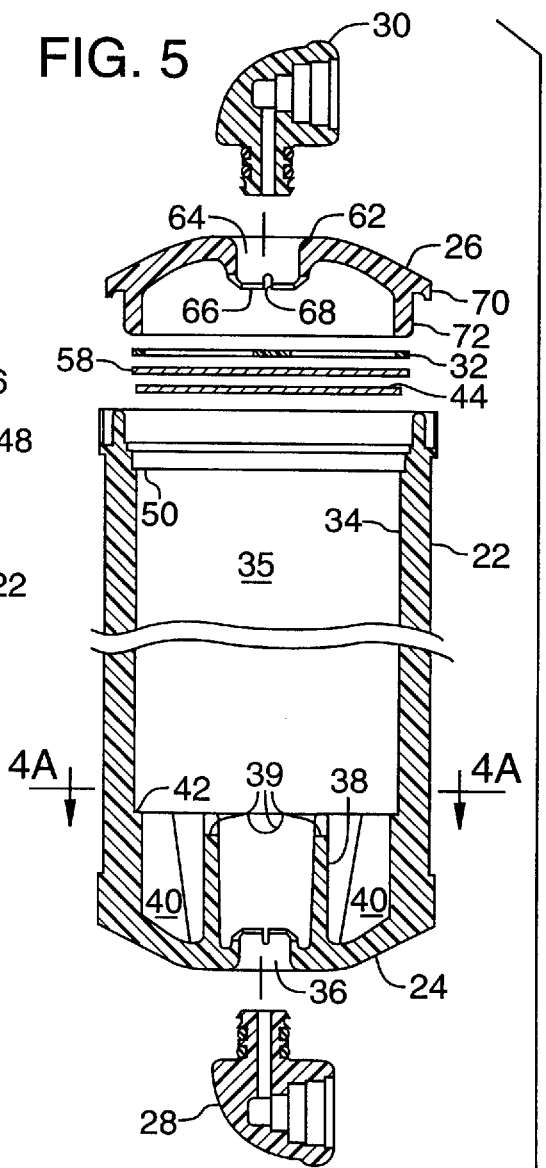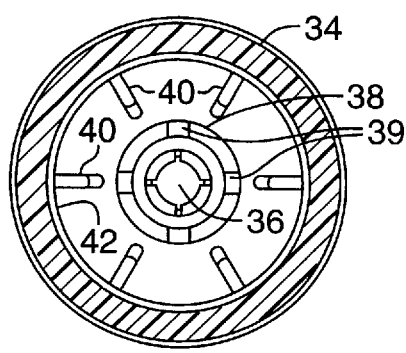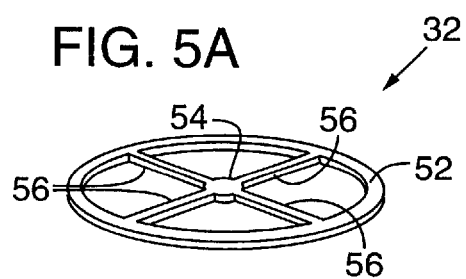

INLINE FILTER HAVING SWIVEL FITTING

TECHNICAL FIELD

The invention relates generally to filters and more particularly to inline filters having a swivel fitting on at least one end.

BACKGROUND ART

Filters are commonly used to purify liquids such as water. Inline filters, which have an inlet at one end out an outlet at the other, are convenient for many different filter applications.

An inline filter, in its simplest form, is merely a hollow vessel holding a filtration medium that has an inlet port at one end and an outlet port at the other end. Typically, associated with the inlet and output ports are fittings for connecting supply and drain tubing.

A common fitting is a "right-angle" fitting that allows the supply and drain tubing to connect to the inlet and outlet ports at right angles to the axis of the tubing, facilitating a compact or convenient tubing arrangement in certain applications. Prior filters have included right angle fittings integral to their ports. Unfortunately, constructing an inline filter with right-angle fittings as integral with the ports fixes their coupling angles.

If such a filter has a circular cross section, then it may be possible for the entire filter to be rotated within its mounting to adjust the coupling angles of the fittings. However, rotating the filter causes both fittings rotate the same angle. There is no way to adjust the radial coupling angles of the fittings with respect to each other.

What is needed is a filter construction that allows for independent adjustment of the radial angles of right-angle fittings for inline filters.

DISCLOSURE OF THE INVENTION

It is therefore an object of the present invention to provide an inline filter that has right-angle fittings that can rotate independently of each other and independently of the filter body.

According to the present invention, the foregoing and other objects and advantages are attained by a filter design and right-angle fitting design which enables the right-angle fittings to rotate with respect to the filter body while maintaining a leak-proof seal.

As an advantage of the present invention, maximum flexibility and adjustability in the routing of source and drain tubing is achieved.

These and other features, advantages, and objects of the present invention will become apparent to those skilled in the art upon examination of the following specification when taken in conjunction with the drawings.

BRIEF DESCRIPTION OF THE DRAWINGS

FIG. I is a perspective view of a filter constructed according to the present invention having two swivel right-angle fittings.

FIG. 4 is a sectional view of the filter, taken along line 4—4 of FIG. 2.

FIG. 4A is a sectional view of the filter, taken along line 4A—4A of FIG. 4.

FIG. 5 is an expanded sectional view of the filter of FIG. 4, before final assembly, with the filtration medium removed for clarity.

FIG. 5A is a perspective view of a deflector.

DETAILED DESCRIPTION OF THE INVENTION

Figure 1:
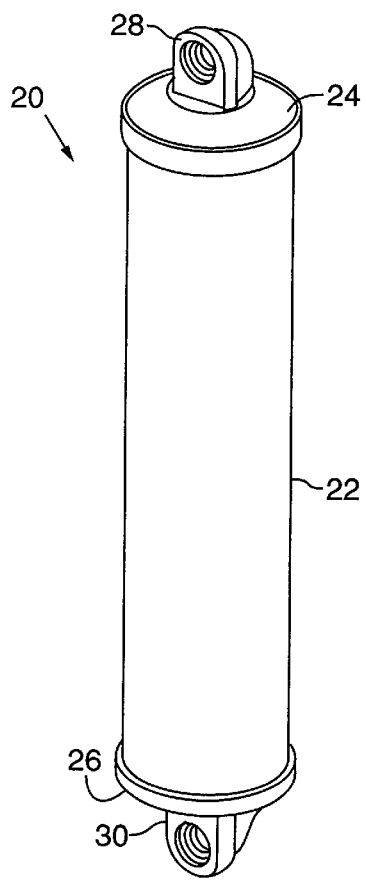
Figure 2:
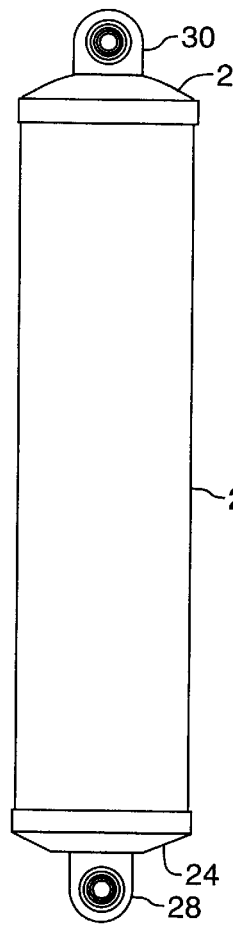
FIG. 2 is a front elevation view of the filter of FIG. 1.
Figure 3:
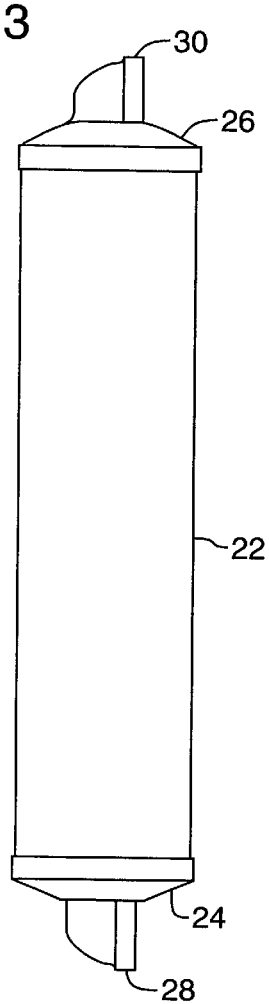
FIG. 3 is a side elevation view of the filter of FIG. 1.

Referring now to the drawings, and with particular reference to FIGS. 1 through 3, an exemplary inline filter 20 according to the present invention comprises a hollow body 22 having an integrally-formed cap 24 at its lower end and a spin-welded cap 26 at its upper end. ("Upper" and "lower" are used for convenience in referring to elements of the filter in the drawings and not to indicate required orientations of the filter 20 during use.) Attached to both caps 24, 26 are respective right-angle swivel fittings 28, 30. The fittings 28, 30 couple to inlet and outlet tubing (not shown). Water from the inlet tubing passes through the filter 20 and is filtered thereby before exiting out the outlet tubing.

Referring now to FIGS. 4 and 5, the filter 20 comprises five main components: the body 22, the cap 26, the swivel right-angle fittings 28, 30, and a deflector 32. These components are made from polypropylene, acrylonitrile butadine styrene (ABS), or another suitable material. If the filter 20 is to be used to filter potable water, the filter material should be approved for such use. In an exemplary filter 20, these main components are manufactured using an injection molding process.

Referring to FIGS. 4, 4A, and 5, the filter body 22 has a cylindrical wall 34 defining an interior media chamber 35 that has a circular cross section. In a first exemplary filter 20, the media chamber 35 has a diameter of 1.5 inches (38.1 mm). In a second exemplary filter 20, the media chamber 35 has a diameter of 2.0 inches (50.8 mm). The wall 34 has a thickness of 0.25 inches (6.35 mm), resulting in outside diameters for the first and second exemplary filters of 2.0 inches (50.8 mm) and 2.5 inches (63.5 mm), respectively. For both exemplary filters, the media chamber 35 is 13 inches (330.2 mm) long. It should be recognized that an inline filter can have shapes and dimensions other than those described above without departing from the spirit of the present invention.

The body 22 is sealed at one end by the integrally-formed cap 24 having a port 36 therethrough. Referring to FIGS. 4A and 5, surrounding port 36 and within the interior of body 22 is a cylindrical cup 38. Four semicircular notches 39 are evenly spaced on the top edge of the cup 38.

Adjacent to the cup 38, a plurality of narrow fins 40 are spaced radially about the interior if cylindrical wall 34. A lower ledge 42 is formed on the inside of wall 34. The top edges of the cup 38, the fins 40, and the ledge 42 meet at a common plane. A disc of felt 44 is sonically welded to the cup 38, the fins 40, and the ledge 42 on this plane. The diameter of the felt disc 44 matches the inside diameter of the wall 34 at the lower ledge 42. In an exemplary embodiment of the filter 20, the felt disc 44 is 0.125 in (3.175 mm) thick and is made from polypropylene with 20 micron nominally rated pore sizes.

At the upper end of the filter body 22 is a cylindrical spin weld ledge 46, or "interference point," surrounded by a cylindrical shield 48. The wall 34 also includes an upper ledge 50.

Referring now to FIG. 5A, the deflector 32 comprises a circular outer ring 52, a circular inner disk 54, and radial arms 56, all formed as an integral whole. In an exemplary filter 20, the deflector is 0.125 inch (3.175 mm) high, the outer ring 52 and radial arms are 0.125 inch (3.175 mm) wide, and the inner disk is 0.5 inch (12.7 mm) in diameter. The outer diameter of the deflector 32 is sized to fit snugly against the interior surface of the cylindrical wall 34 at the upper ledge 50.

Referring again to FIG. 5, the cap 26 includes a substantially planar portion 62 having a port 64 therethrough. Around the perimeter of the port 64 are a plurality of resilient tabs 66 separated by slots 68. Around the perimeter of the cap 26 is a lip 70. Projecting substantially perpendicular from the planar portion 62 is a cylindrical spin weld tail 72. In an exemplary embodiment, the outer diameter of the spin weld tail 72 is 2.130 inches (54.10 mm); the inner diameter of the spin weld ledge 46 steps from 2.158 inches (54.81 mm), to 2.125 inches (53.98 mm), and then to 2.100 inches (53.34 m).

During assembly, the lower felt disc 44 is sonically welded to the upper edges of the fins 40, the cup 38, and the lower ledge 42. The media chamber 35 is then filled with a selected filtration media, such as granulated activated carbon. A second disc of felt 58, similar in material to the first felt disk 44 and having the same diameter as deflector 32, is sonically welded to the lower surface of the deflector 32. Then the deflector-felt disc unit is placed in the filter 20 with its felt side against the upper ledge 50. The two felt discs 44, 58 contain the filtration medium 60 within the filter body 22.

The cap 26 and body 22 are joined in a process known as "spin welding." The spin weld tail 72 of the cap 26 is forced against the spin weld ledge 46 of the body 22 and rotated at high torque about their common axis. Friction between the spin weld tail 72 and the spin weld ledge 46 generates heat that softens and melts them both, melding their adjacent surfaces together. The cap 26 is further rotated and forced into the body 22 until the upper surface of the cap 26 is flush with the upper surface of the shield 48, as shown in FIG. 4. The deflector 32 prevents any molten plastic from leaking into the media chamber 35.

Figure 6:
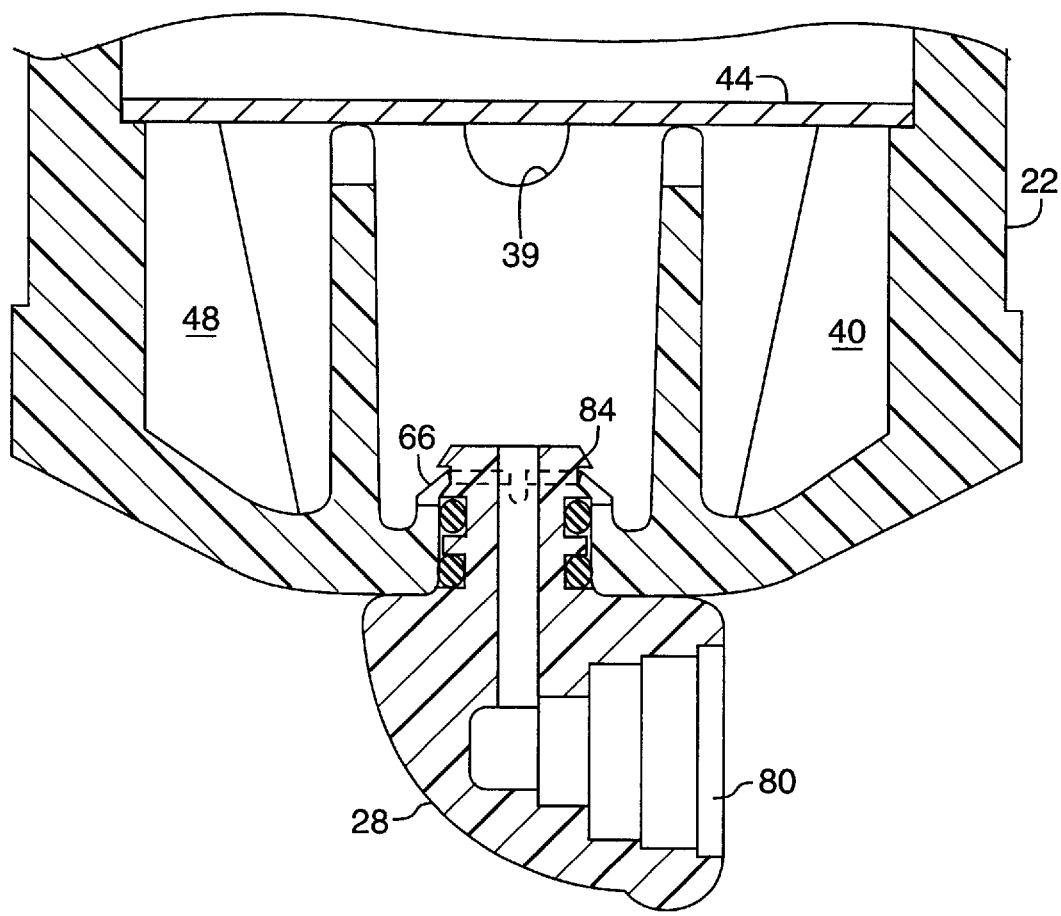
FIG. 6 is an enlarged sectional view of one end of the filter having a swivel right-angle fitting with a quick disconnect coupling.
Figure 7:
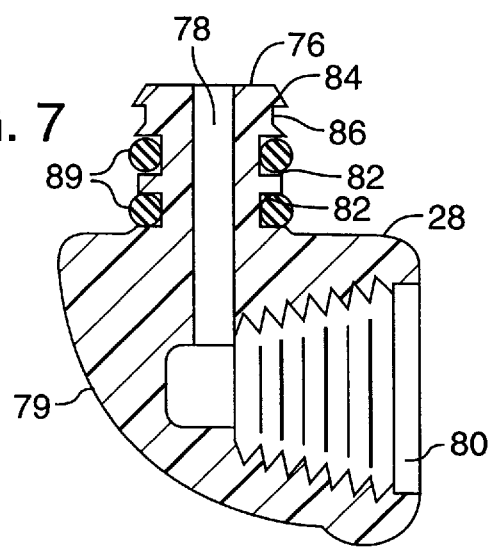
FIG. 7 is an enlarged sectional view of a swivel right-angle fitting with a taper threaded coupling.

Referring now to FIGS. 6 and 7, a right-angle fitting 28 comprises a head portion 74 and a cylindrical stem portion 76. A passage 78 through the stem portion 76 is in communication with a coupling 80. The coupling 80 couples a tubing to the fitting 28 perpendicular to the axis of the stem portion 76. The coupling 80 can be a taper threaded coupling as shown in FIG. 7, or a quick-disconnect type, which uses a collet, a collar, and an O-ring (not shown) to couple a tubing to the fitting 74, as shown in FIG. 6. Alternatively, the fitting 28 may use some other type of coupling.

The stem portion 76 includes two annular grooves 82 sized to retain respective rubber O-rings 84. The outer diameter of the stem portion 76 is slightly smaller than the inner diameter of the port 36 such that, with the O-rings 84, a water-tight seal is formed between the fitting 28 and caps 24, 26. Furthermore, the fitting 28 can rotate about the axis of the stem portion 76 while retaining the seal.

At the end of the stem portion 76 is a ridge 84 adjacent to an annular notch 86. When the stem portion 76 of the fitting 28 is pushed into the port 36, the tabs 66 flex to allow the angled ridge 84 to pass between the tabs 66. After the fitting 28 has traveled sufficiently far, the tabs 66 snap into engagement with the notch 86 and prevent the fitting 28 from being removed from the port 36. During use of the filter 20, internal water pressure on the tabs 66 increases their grasp on notch 86 and ridge 84.

Referring again to FIGS. 1 through 3, an inline filter according to the present invention includes at least one swivel right-angle fitting; the filter 20 shown in FIGS. 1 through 7 has two swivel right-angle fittings 28, 30. These fittings 28, 30 can rotate independent of each other and independently of the filter body 22, allowing for maximum flexibility and simplicity in the routing of source and drain tubing (not shown).

Referring again to FIG. 4, when in use, water enters the filter 20 through the upper swivel right-angle fitting 30. The water passes through the open spaces of the deflector 32 and then through the upper felt disc 50 into the filtration medium 60. Next, the water passes through the lower felt disc 44. Water passing through the center region of the lower felt disc 44 directly enters the cup 38; water passing through the outer regions of the lower felt disc 44 enters the cup through the four semicircular notches 39. The now-filtered water exits the filter 20 through the lower swivel right-angle fitting 28.

Figure 8:
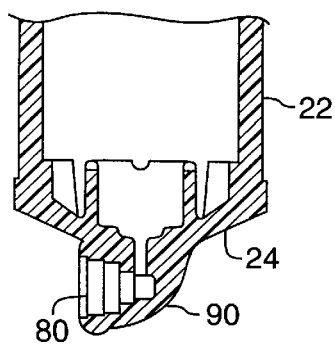
FIG. 8 is a sectional view of one end of a filter having an integral right-angle fitting with a quick disconnect coupling.
Figure 9:
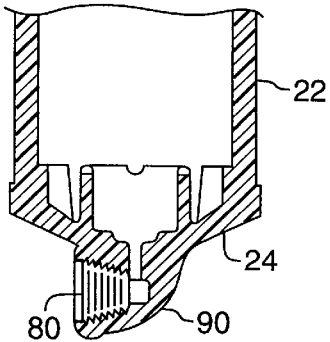
FIG. 9 is a sectional view of one end of the filter having an integral right-angle fitting with a taper threaded coupling.

Referring now to FIGS. 8 and 9, one of the caps 24, 26 may include an integral fitting 90. FIG. 8 shows a right-angle fitting 90 having a quick-disconnect coupling 80, and being integral with the integrally-formed cap 24. The right-angle fitting 90 of FIG. 9 has a taper threaded coupling 80. When used in conjunction with a filter mounting (not shown) that allows the filter body 22 to be rotated, the filters of FIGS. 8 and 9 that have only one right angle fitting that swivels can still independently adjust the desired angles of both right angle fittings 30, 90.

Figure 10:
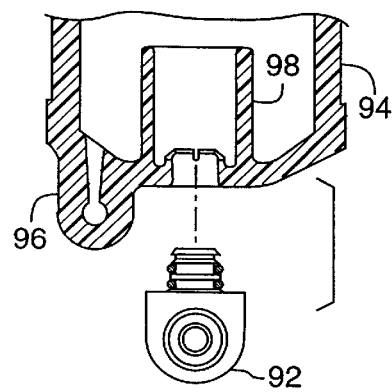
FIG. 10 is an exploded elevational view, partially in section, of one end of a reverse osmosis filter having a swivel right-angle fitting and an integral brine fitting.

Referring now to FIG. 10, a swivel fitting 92 can be used in a reverse osmosis filter 94 that has a brine port 96. The swivel fitting 92 connects to the filter 94 in the same manner described above. A reverse osmosis membrane (not shown) is pressed into the cup 98.

The terms and expressions which have been employed in the foregoing specification are used therein as terms of description and not of limitation, and there is no intention, in the use of such terms and expressions, of excluding equivalents of the features shown and described or portions thereof, it being recognized the scope of the invention is defined and limited only by the claims which follow.

What is claimed is:

1. An inline filter, comprising:
    a tubular filter body having a first end and a second end and a longitudinal axis between said first and second ends, said filter body defining a hollow interior and defining openings at each of said ends, said openings being in communication with said interior;
    a first cap attached to said filter body at said first end, said first cap sealing said opening at said first end;
    a second cap attached to said filter body at said second end, said second cap sealing said opening at said second end;
    a first right-angle fitting attached to said first cap, said first fitting adapted to connect a first tube to said filter, where said first fitting can rotate about a second axis parallel to said longitudinal axis; and
    a second right-angle fitting attached to said second cap, said second fitting including coupler means for connecting a second tube to said filter, wherein unfiltered liquid enters said filter through one of said first and second fittings and filtered liquid exits said filter through another of said first and second fittings, whereby rotation of said first right-angle fitting and said filter body allows for independent adjustment of radial angles of said first and second right-angle fittings.

2. The inline filter of claim 1, wherein said first cap and said filter body are injection molded as a single piece.

3. The inline filter of claim 1, wherein said second cap and said second right-angle fitting and said filter body are injection molded as a single piece.

4. The inline filter of claim 1, wherein said second fitting can rotate about a third axis parallel to said longitudinal axis.

5. The inline filter of claim 4, wherein said second cap and said filter body are injection molded as a single piece.

6. The inline filter of claim 1, wherein said filter body has a circular cross section.

7. An inline filter, comprising:

a cylindrical filter body having a first end and a second end and a longitudinal axis therebetween, said filter body defining a hollow interior and defining openings at each of said ends, said openings being in communication with said interior;

a first cap attached to said filter body at said first end and sealing said opening at said first end, said first cap defining a circular port having annular resilient tabs;

a second cap integral with said filter body at said second end, said second cap sealing said opening at said second end;

a first right-angle fitting having a cylindrical stem portion with an annular ridge engaging said annular resilient tabs of said first cap, said first fitting adapted to connect a first tube to said filter, said first fitting being able to rotate about a second axis parallel to said longitudinal axis; and a second right-angle fitting attached to said second cap, said second fitting adapted to connect a second tube to said filter.

8. The inline filter of claim 7, further comprising an annular O-ring surrounding said stem portion of said first right-angle fitting and being interposed between said stem portion and said port of said first cap.

9. The inline filter of claim 7, wherein said second cap defines a second circular port having a second plurality of annular resilient tabs, and wherein said second right-angle fitting has a second cylindrical stem portion with a second annular ridge engaging said second plurality of annular resilient tabs of said second circular port.

10. The inline filter of claim 9, further comprising a second annular O-ring surrounding said second stem portion of said second right-angle fitting and being interposed between said second stem portion and said second port of said second cap.

* * * * *